United States Patent
Hegenbart et al.

(10) Patent No.: US 10,714,249 B2
(45) Date of Patent: Jul. 14, 2020

(54) 3D PRINTER WITH HOVERING PRINTING HEAD OR PRINTING BED

(71) Applicant: Airbus Operations GmbH, Hamburg (DE)

(72) Inventors: Matthias Hegenbart, Hamburg (DE); Peter Linde, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 250 days.

(21) Appl. No.: 15/654,326

(22) Filed: Jul. 19, 2017

(65) Prior Publication Data

US 2018/0061543 A1  Mar. 1, 2018

(30) Foreign Application Priority Data

Aug. 29, 2016 (EP) .................................. 16186085

(51) Int. Cl.
| | |
|---|---|
| *B33Y 30/00* | (2015.01) |
| *B29C 64/00* | (2017.01) |
| *H01F 7/02* | (2006.01) |
| *B29C 64/205* | (2017.01) |
| *B29C 64/227* | (2017.01) |
| *B33Y 50/02* | (2015.01) |
| *H01F 13/00* | (2006.01) |
| *H05H 15/00* | (2006.01) |
| *B33Y 10/00* | (2015.01) |
| *G01N 21/84* | (2006.01) |

(52) U.S. Cl.
CPC ......... *H01F 7/0242* (2013.01); *B29C 64/205* (2017.08); *B29C 64/227* (2017.08); *B33Y 30/00* (2014.12); *B33Y 50/02* (2014.12); *H01F 13/003* (2013.01); *H05H 15/00* (2013.01); *B33Y 10/00* (2014.12); *G01N 2021/8438* (2013.01)

(58) Field of Classification Search
CPC ..... H01F 7/0242; H01F 13/003; B33Y 30/00; B33Y 50/02; B29C 64/227; B29C 64/205; H05H 15/00; G01N 2021/8438
USPC .......................................................... 425/3
See application file for complete search history.

(56) References Cited

U.S. PATENT DOCUMENTS

| | | | |
|---|---|---|---|
| 2006/0016365 A1* | 1/2006 | Baldi | ...................... B60L 13/04 104/281 |
| 2016/0031156 A1* | 2/2016 | Harkness | .............. B29C 64/112 264/427 |
| 2017/0350115 A1* | 12/2017 | Rocher | ................. E04B 1/3505 |

FOREIGN PATENT DOCUMENTS

WO  WO-2014189371 A2 * 11/2014

* cited by examiner

*Primary Examiner* — Alison L Hindenlang
*Assistant Examiner* — Andrés E. Behrens, Jr.
(74) *Attorney, Agent, or Firm* — Greer, Burns & Crain Ltd.

(57) ABSTRACT

A three-dimensional printing device includes a movable unit with a superconductor and a printing head arrangement for printing a printing material, a magnetic field generator adapted to generate a magnetic field, and a control device. The magnetic field generator and the movable unit are adapted for coupling in a force-locking manner by means of frozen magnetic flux, and the controlling device is adapted to control a magnetic field strength of the magnetic field generator.

14 Claims, 6 Drawing Sheets

3D PRINTER WITH HOVERING PRINTING HEAD OR PRINTING BED

CROSS-REFERENCE TO PRIORITY APPLICATION

This application claims the benefit of, and priority to, European patent application number 16186085.3, filed on Aug. 29, 2016.

TECHNICAL FIELD

Embodiments of the present invention relate to a 3D printer or 3D printing device with a hovering printing head using a frozen magnetic flux. In addition, embodiments relate to a 3D printer or 3D printing device in which the printing bed is hovering using a frozen magnetic flux.

BACKGROUND

In recent years, the use of 3D printers has spread widely. In general, such 3D printing devices consist of a printing bed, a printing head that is moving in space over the printing bed. The printing head is fixed onto a cross beam that runs on rails. In addition, the printing bed can be elevated mechanically.

Such 3D printers may be used to replicate items, for production or prototyping. Due to the structure of present 3D printers, restrictions as for example in the dimension of the object which can be printed or in the speed of the printing are given.

BRIEF SUMMARY

Therefore, it might be desirable to provide an improved 3D printing device.

According to a first aspect, a 3D printing device is provided, comprising a movable unit with a superconductor and a printing head arrangement for printing a printing material, a magnetic field generator adapted to generate a magnetic field and a control device. The magnetic field generator and the movable unit are adapted for coupling in a force-locking manner by frozen magnetic flux, and the controlling device is adapted to control a magnetic field strength of the magnetic field generator.

According to the first aspect, a 3D printer may be provided having less moving mechanical machinery parts, less parts to maintain, while at the same time increasing the speed and the accuracy of the control and allowing for the printing of objects having larger dimensions.

The 3D printing device may further comprise a movement device for moving the magnetic field generator in one direction, preferably two directions, perpendicular to a force-locking direction between the movable unit and the magnetic field generator.

The movement device may be at least one linear motor, preferably a plurality of linear motors.

The magnetic field generator and the movable unit may be adapted for coupling in a force-locking manner by frozen magnetic flux between the magnetic field generator and the superconductor.

The 3D printing device may further comprise a coupling device with another magnetic field generator adapted to generate a magnetic field and another superconductor, wherein the magnetic field generator of the 3D printing device and the superconductor of the coupling device may be adapted for coupling in a force-locking manner by frozen magnetic flux between the magnetic field generator of the 3D printing device and the superconductor of the coupling device, and the magnetic field generator of the coupling device and the superconductor of the movable unit may be adapted for coupling in a force-locking manner by frozen magnetic flux between the magnetic field generator of the coupling device and the superconductor of the movable unit.

The controlling device may be adapted to control a magnetic field strength of the magnetic field generator of the coupling device to move the movable unit.

The 3D printing device may further comprise a supply tube connected to the print head and adapted to supply printing material to the print head.

The movable unit may further comprise a connection arrangement adapted to carry the printing head.

The 3D printing device may further comprise a second magnetic field generator, wherein the second magnetic field generator may be located on a side of the movable unit opposite to the magnetic field generator, and the second magnetic field generator may be adapted for coupling in a force-locking manner by frozen magnetic flux.

The force-locking direction between the movable unit and the second magnetic field generator may be in line with the force-locking direction between the movable unit and the magnetic field generator.

The second magnetic field generator may be adapted for coupling in a force-locking manner by frozen magnetic flux between the second magnetic field generator and the superconductor.

The 3D printing device may further comprise a third magnetic field generator, wherein the third magnetic field generator may be located on a side of the movable unit perpendicular to the side on which the magnetic field generator is located, and the third magnetic field generator may be adapted for coupling in a force-locking manner by frozen magnetic flux.

The force-locking direction between the movable unit and the third magnetic field generator may be perpendicular to the force-locking direction between the movable unit and the magnetic field generator, and the third magnetic field generator may be adapted to move the movable unit in a direction perpendicular to the force-locking direction between the movable unit and the magnetic field generator.

According to another aspect a 3D printing device may be provided comprising a movable unit with a superconductor and a print bed, a magnetic field generator adapted to generate a magnetic field, a printing head arrangement for printing a printing material, and a control device, wherein the magnetic field generator and the movable unit are adapted for coupling in a force-locking manner by frozen magnetic flux, and the controlling device is adapted to control a magnetic field strength of the magnetic field generator.

With this arrangement, a 3D printer is provided in which a print head is fixed and a print bed may be moved by elevation beams which allows for easy and fast manufacturing of parts having a smaller but complex geometry.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Further advantageous embodiments and improvements will be described in the following with reference to the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
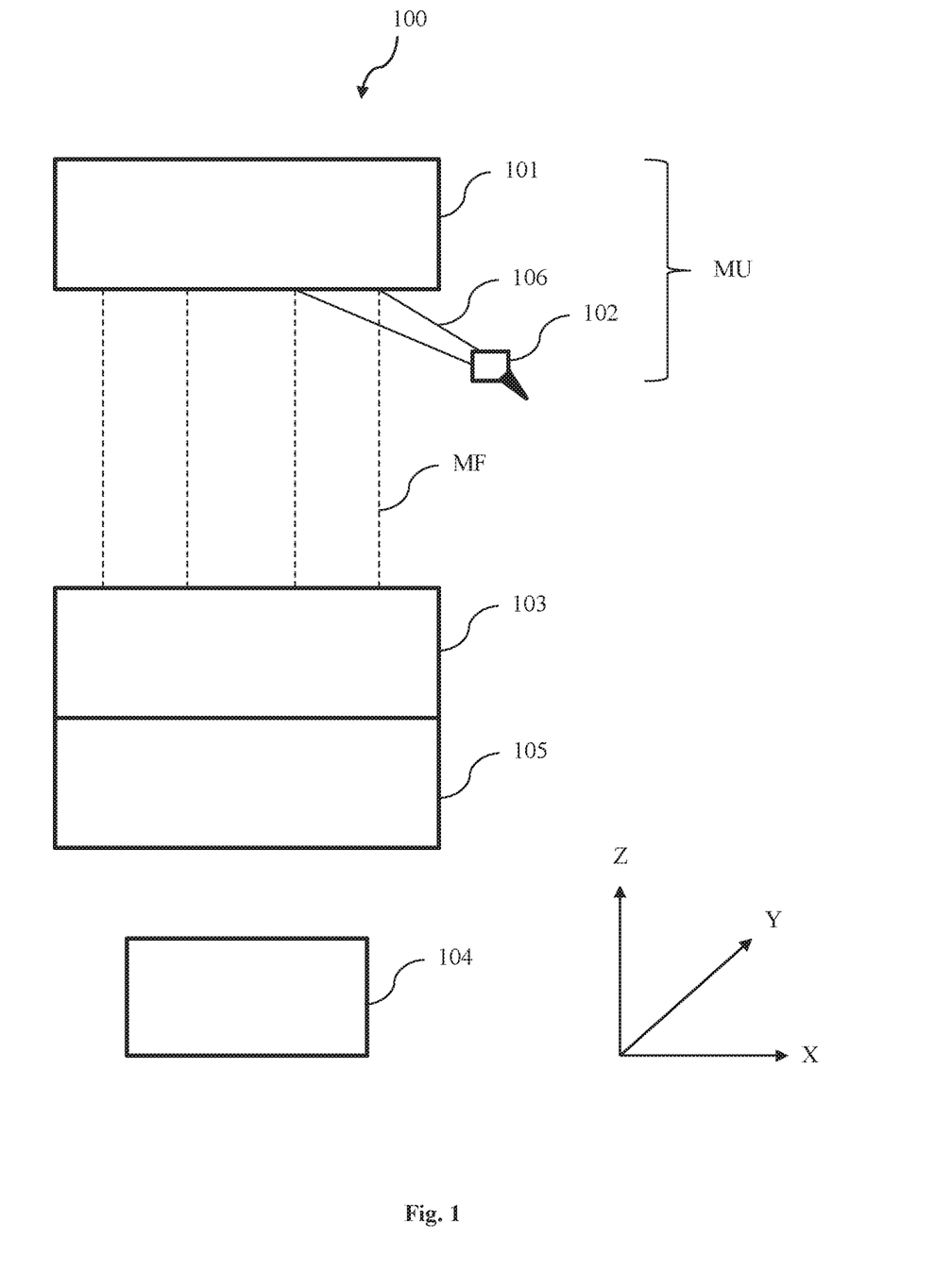
FIG. 1 illustrates a 3D printing device according to an exemplary embodiment.

FIG. 1 shows a 3D printing device 100, also referred to as a 3D printer. This 3D printer 100 comprises on the one hand a movable unit MU which comprises a superconductor 101 (also referred to as a superconductor block) and a printing head arrangement 102 and comprises on the other hand a magnetic field generator 103. In addition, a control device 104 is provided in the 3D printing device 100.

As may be taken from FIG. 1, the printing head arrangement 102 which is adapted for printing a printing material is attached to the superconductor 101 and forms a movable unit with the same. Suitable printing material may be non-magnetic and non-superconductive. Preferably, the attachment of the printing head arrangement 102 to the superconductor 101 may be made for example by a structure of thin arms 106, being part of the movable unit MU, as shown in FIG. 1. The superconductor 101, and hence the movable unit MU, may be coupled to the magnetic field generator 103 in a forced-locking manner by a frozen magnetic flux between the magnetic field generator 103 and the superconductor 101. The control device 104 may be used for controlling the magnetic field generator 103. In particular, the strength of a magnetic field generated by the magnetic field generator 103 may be controlled using the control device 104. This magnetic field of the magnetic field generator 103 is directed to the superconductor 101.

By using the magnetic field and, hence, by the frozen magnetic flux, the movable unit MU may be made to elevate or float in a certain distance from the magnetic field generator 103 such that a certain gap may be achieved between the magnetic field generator 103 and the superconductor 101. This gap may be adjusted by adjusting the strength of the magnetic field of the magnetic field generator 103. Preferably, the magnetic field generator 103 may be constructed using one or a plurality of electromagnets and the magnetic field of the electromagnets may be controlled using the control device 104.

In this way, the movable unit MU and thus the printing head arrangement 102 may be moved in space by controlling the distance between the magnetic field generator 103 and the superconductor 101 by adjusting the magnetic field of the magnetic field generator 103.

Further, a movement device 105 for moving the magnetic field generator 103 in one dimension or preferably in two dimensions perpendicular to a force-locking direction between the movable unit MU and the magnetic field generator 103 may be provided. As an example, as may be taken from FIG. 1, the force-locking direction is in the direction Z. The movement device 105 may therefore be adapted to move the magnetic field generator 103 in directions X and Y which are perpendicular to another and both perpendicular to the force-locking direction in direction Z.

Such a movement device 105 may preferably be constructed in the form of one or a plurality of linear motors, for example a mesh of linear motors, i.e. of electromagnets in series. By controlling the power of the linear motors, the magnetic fields of the electromagnets of the linear motor may be steered and by that the position of the magnetic field generator 13 may be changed in either one or both of directions Y and X. In addition, also a displacement may be performed in the form of a rotation around axis Z.

Therefore, with the movement device 105, the magnetic field generator 103 may be moved which results in a displacement or a movement of the magnetic field. Since the magnetic field generator 103 is coupled to the movable unit MU via the frozen magnetic flux, the same displacement is also performed by the movable unit MU.

Hence, by using the movement device 105 and by controlling the strength of the magnetic field of the magnetic field generator 103, a displacement in all directions in space of the movable unit MU and even a rotation of the movable unit MU is possible. Thus, the printing head arrangement 102 which is used for printing an object by for example extrusion deposition may be moved freely in space to create a desired object.

Using a hovering printing head or printing head arrangement 102, the amount of moving mechanical machinery parts may be reduced since no cross beams and rails are needed for connecting the printing head arrangement 102. In addition, the movements may be controlled very fast and very accurate also over large distances. This allows the printing of large printing volumes or large objects.

The frozen magnetic field is the result of the Meissner-Ochsenfeld effect occurring in a superconductor when a magnetic field of sufficient strength is applied thereto and if the superconductor is cooled below its critical temperature. As is well known to the skilled person, below the critical temperature a superconductor does not only change its electric conductivity. Below the critical temperature a superconductor may also store or "freeze" the magnetic field generated by a permanent magnet (or generated by any other means). To illustrate the effect of the frozen magnetic flux: if a non-magnetic distance rod is placed between the magnet and the superconductor and the superconductor is cooled below its critical temperature and the rod is removed, the superconductor will float stably above the magnet. If the superconductor is shifted, it will always return to its "stored" position. In this manner, the movable unit which carries the printing head arrangement 102 will substantially float above the magnetic field generator 103. The strength of the force-locked coupling of course depends on the superconducting material, the amount of cooling and the magnetic field strength of the magnetic field MF. The control device 104 may be provided to adjust the gap. In fact, by adjusting the strength of the magnetic field, the distance between the movable unit MU and the magnetic field generator 103 may be adjusted. In this manner, the magnetic field generator 103 can not only move the movable unit MU in a plane substantially perpendicular to the force-locking direction between the magnetic field generator 103 and the movable unit MU, but it may also vary the distance therebetween.

As described above, the force-coupling or force-locking allows not only translational movements but also rotational movements in any plane, depending on the movement path of the magnetic field generator 103. Thus, movement of the movable unit MU may not only take place in the X and Y directions in FIG. 1 but also in a rotational manner e.g. around the Z axis. As already mentioned above, the magnetic field strength may be adjusted by the control device 104 to also vary the gap width G between the magnetic field generator 103 and the movable unit MU in the Z direction.

By using superconductive electromagnets, strong magnetic fields may be created and as a consequence large distances may be bridged with the frozen magnetic flux, which may also be referred to as an elevating beam.

If larger distances are to be bridged, to allow the printing of even larger objects, additional elements may be provided which shall be described in the following.

Figure 2:
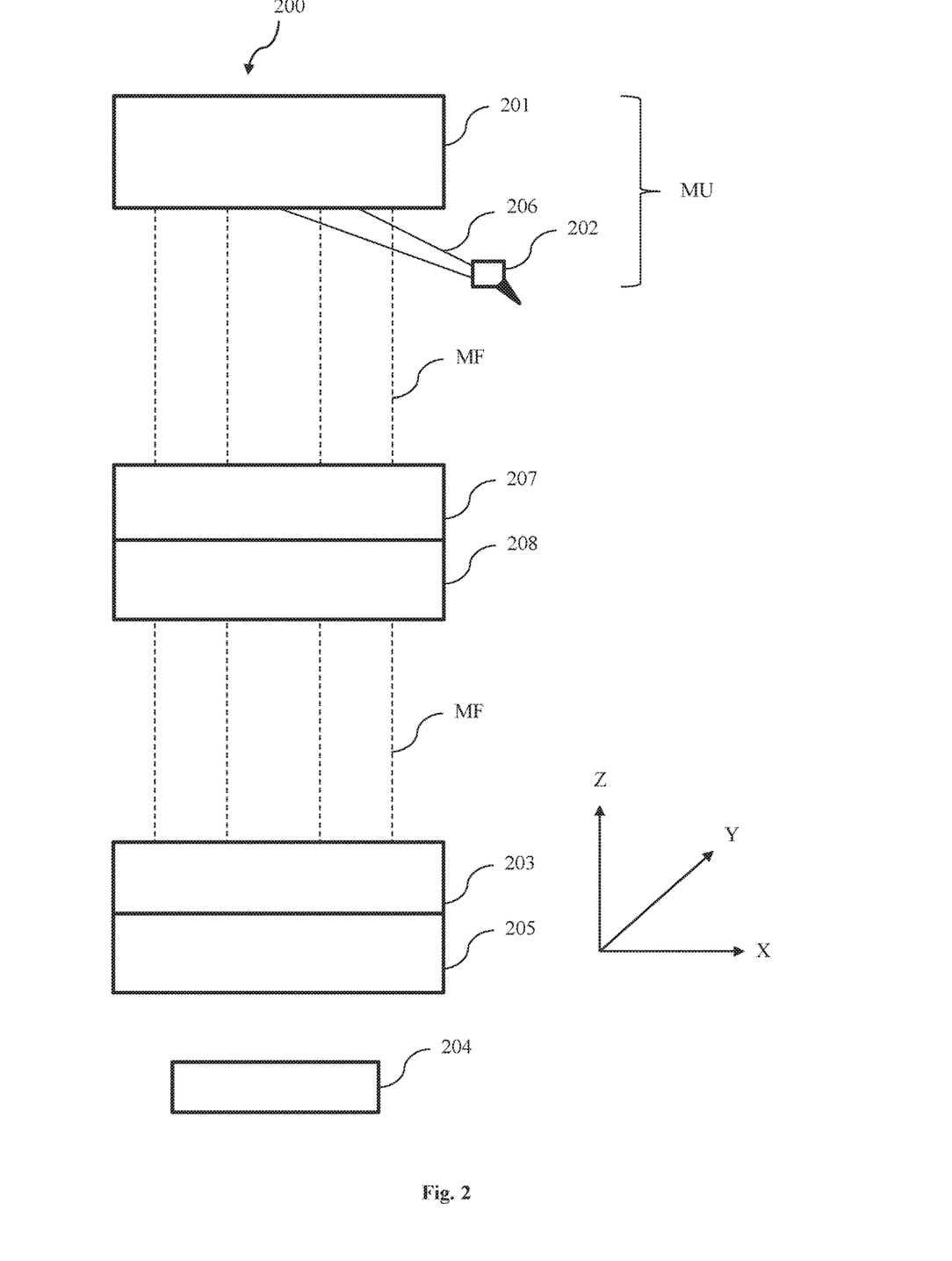
FIG. 2 illustrates a 3D printing device according to another exemplary embodiment including a coupling device.

As may be taken from FIG. 2, in one embodiment which has been adapted to cover larger distances, in addition to the previously described movable unit MU with the superconductor 201 (also referred to as the superconductor 201 of the 3D printing device 200) and the printing head arrangement 202, the arms 206, the magnetic field generator 203 (also referred to as the magnetic field generator 203 of the 3D printing device 200), the control device 204 and the movement device 205, a coupling device 207, 208 is provided. This coupling device 207, 208 comprises another magnetic field generator 207 (also referred to as the magnetic field generator 207 of the coupling device) and another superconductor 208 (also referred to as the superconductor 208 of the coupling device). As may be taken from the figure, this coupling device 207, 208 is arranged between the movable unit MU and the magnetic field generator 203 of the 3D printing device 200. The magnetic field generator 203 of the 3D printing device 200 is coupled with the frozen magnetic flux to the superconductor 208 of the coupling device. In other words, the magnetic field generator 203 of the 3D printing device 200 and the superconductor 208 of the coupling device are coupled in a force-locking manner by a frozen magnetic flux between the magnetic field generator 203 of the 3D printing device 200 and the superconductor 208 of the coupling device. The magnetic field generator 207 of the coupling device, similar to the magnetic field generator 203 of the 3D printer 200 in turn generates another magnetic field and may be constructed for example by using one or a plurality of electromagnets as described above with regard to the magnetic field generator 203 of the 3D printing device 200. With this magnetic field of the magnetic field generator 207 of the coupling device, in turn a frozen magnetic flux between the coupling device and the movable unit MU is created. In other words, the magnetic field generator 207 of the coupling device and the superconductor 201 of the movable unit MU are coupled in a force-locking manner by frozen magnetic flux between the magnetic field generator 207 of the coupling device and the superconductor 201 of the movable unit MU.

Thus, by placing the coupling device between the movable unit MU and the magnetic field generator 203 of the 3D printing device, larger distances may be covered. In turn, as described above, the overall gap between the movable unit MU and the magnetic field generator 203 of the 3D printing device, also referred to as the elevation of the movable unit MU, may be controlled by controlling either one or both of the magnetic fields of the magnetic field generator 203 of the 3D printing device or the other magnetic field generator 207 of the coupling device.

Therefore, by using an additional device, referred to as a coupling device, positioned between the magnetic field generator 203 and the movable unit MU, larger distances may be achieved between the same and thus, printing of larger objects is possible.

Another embodiment will now be described with regard to FIG. 3.

Figure 3:
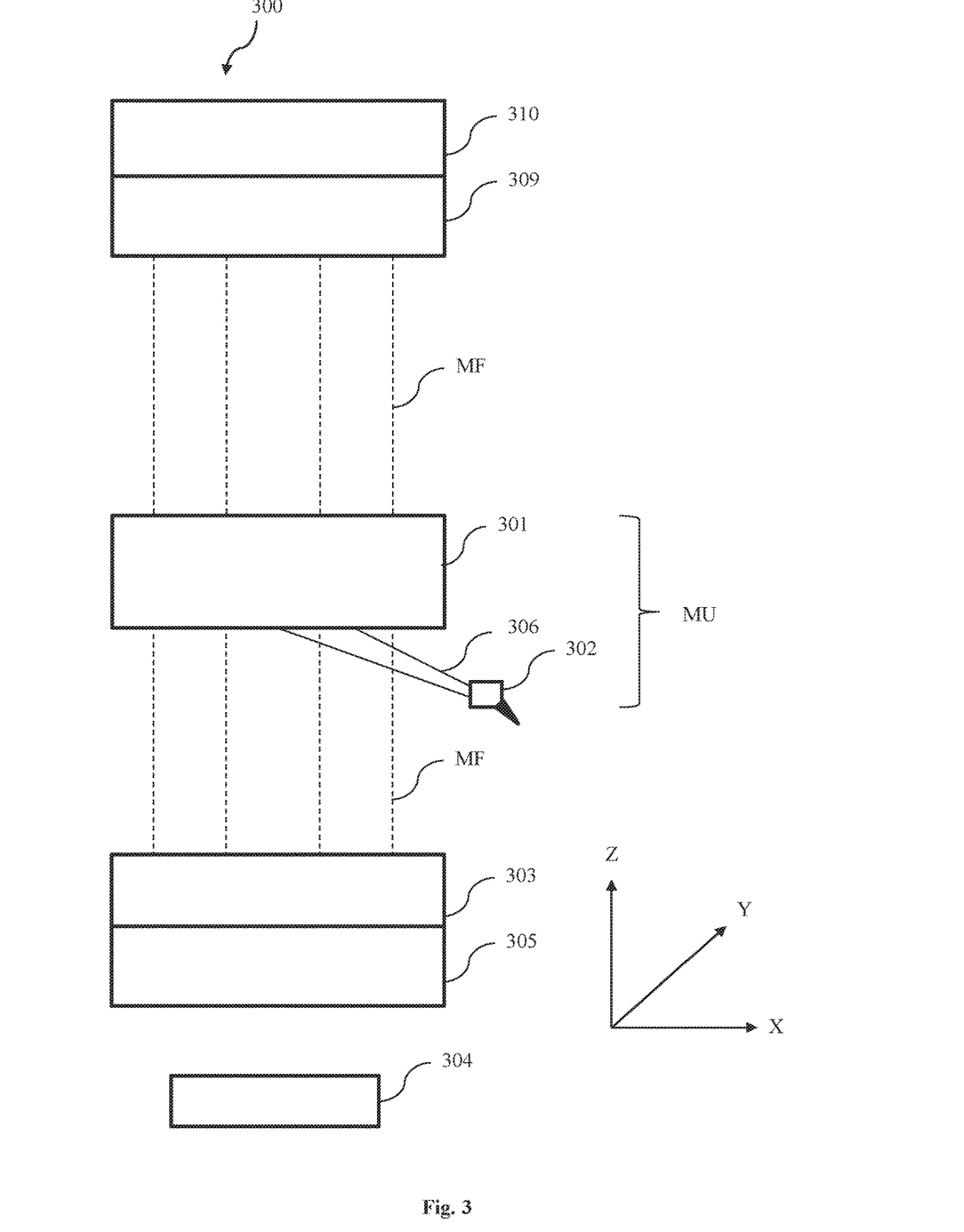
FIG. 3 illustrates a 3D printing device according to another exemplary embodiment including another magnetic field generator on a side opposite to the first magnetic field generator.

As may be taken from FIG. 3, in addition to the elements 301 to 306 i.e., superconductor 301, printing head arrangement 302, magnetic field generator 303, control device 304, movement device 305 and arms 306, which are identical to the elements 101 to 106 described with regard to FIG. 1, another, second, magnetic field generator 309 of the 3D printing device 300, and preferably another, second, movement device 310 of the 3D printing device 300 may be provided.

As may be taken from FIG. 3, the second magnetic field generator and the second movement device of the 3D printing device 300 are provided on a side opposite to the first magnetic field generator 303 and the first movement device 305, i.e. on a side opposite to the first magnetic field generator 303 and the first movement device 305 with regard to the movable unit MU. The second movement device 310 may for example be a linear motor or a plurality of linear motors similar to the one described with regard to item 105 in FIG. 1. It is therefore referred to the description of the same above. This movement device 310 may for example be connected or coupled to a top structure (not shown) of the 3D printing device 300 and may thus be coupled to a surrounding structure (not shown) of the 3D printing device 300.

In similar manner as described with regard to the magnetic field generator 103 above, also the magnetic field generator 309 may be coupled in a force-locking manner by frozen magnetic flux with the movable unit MU and the controlling of the magnetic field may be done in a similar manner as described above with regard to the magnetic field generator 303.

Therefore, by controlling, using for example the control device 304, the magnetic fields of the first magnetic field generator 303 and the second magnetic field generator 309, the elevation of the movable unit MU and thus the position between the two magnetic field generators may be set.

Figure 4:
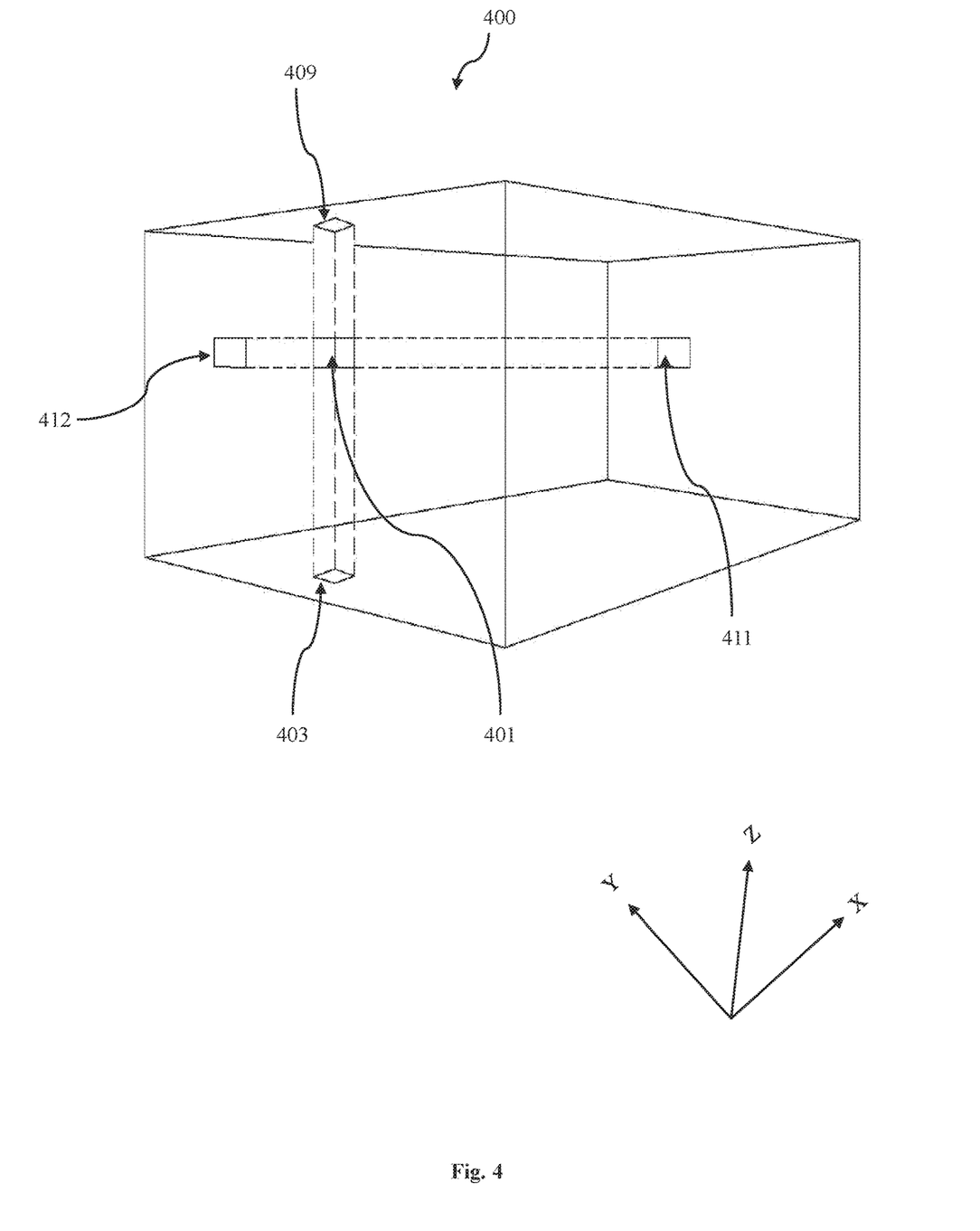
FIG. 4 illustrates a 3D printing device according to another exemplary embodiment including one or two additional magnetic field generators.

It is to be noted that this embodiment may also be combined with one or a plurality of coupling devices as discussed with regard to FIG. 4 such that one or more of the coupling devices may be arranged in the gap between the magnetic field generator (first magnetic field generator) 303 and the movable unit MU and/or between the movable unit MU and the magnetic field generator (second magnetic field generator) 309 as to even further increase the distances which may be covered by the movable unit.

Preferably, the second magnetic field generator 309 may be moved similar to the magnetic field generator 303 with a similar movement device 310 in the directions X and Y to allow a three-dimensional movement of the movable unit MU in space.

Referring to FIG. 4, a further embodiment is described.

As may be taken from the figure, in addition to providing the one or two magnetic field generators 403 and 409 to control the elevation of the movable unit 401, one or two additional magnetic field generators 411, 412 which are referred to as third 411 and fourth 412 magnetic field generators 411 and 412 may be provided. These may be provided on the sides of the movable unit MU which are perpendicular to the sides on which the first and the second magnetic field generators 403, 409 are arranged and may for example be fixed or slidably/movably attached to the outer structure on walls perpendicular to the ones to which the first and second magnetic field generators are slidably/movably attached. Using these additional magnetic field generators which are in structure and in function equivalent to the ones described above, a controlling for example in the Y-direction shown in FIG. 4 it is possible without having to use linear motors or in combination linear motors to extend the distances which may be covered or to fix the movable unit securely in a certain position.

In addition, in one embodiment, one magnetic field generator may be attached to each side of the outer structure shown in FIG. 4 and thus, by using six magnetic field generators, or at least three magnetic field generators which do not oppose each other but the magnetic field of the three are directed in three different, perpendicular, directions, a movement of the movable unit in all three dimensions is possible without having to use linear motors or in addition to using linear motors, simply by controlling the magnetic field strength of the six, or three, magnetic field generators and by slidably or movably attaching/arranging the magnetic field generators to a respective outer structure of the 3D printing device 400 as for example shown as a box in FIG. 4.

Of course, also here, coupling devices may be used in each dimension.

Figure 5:
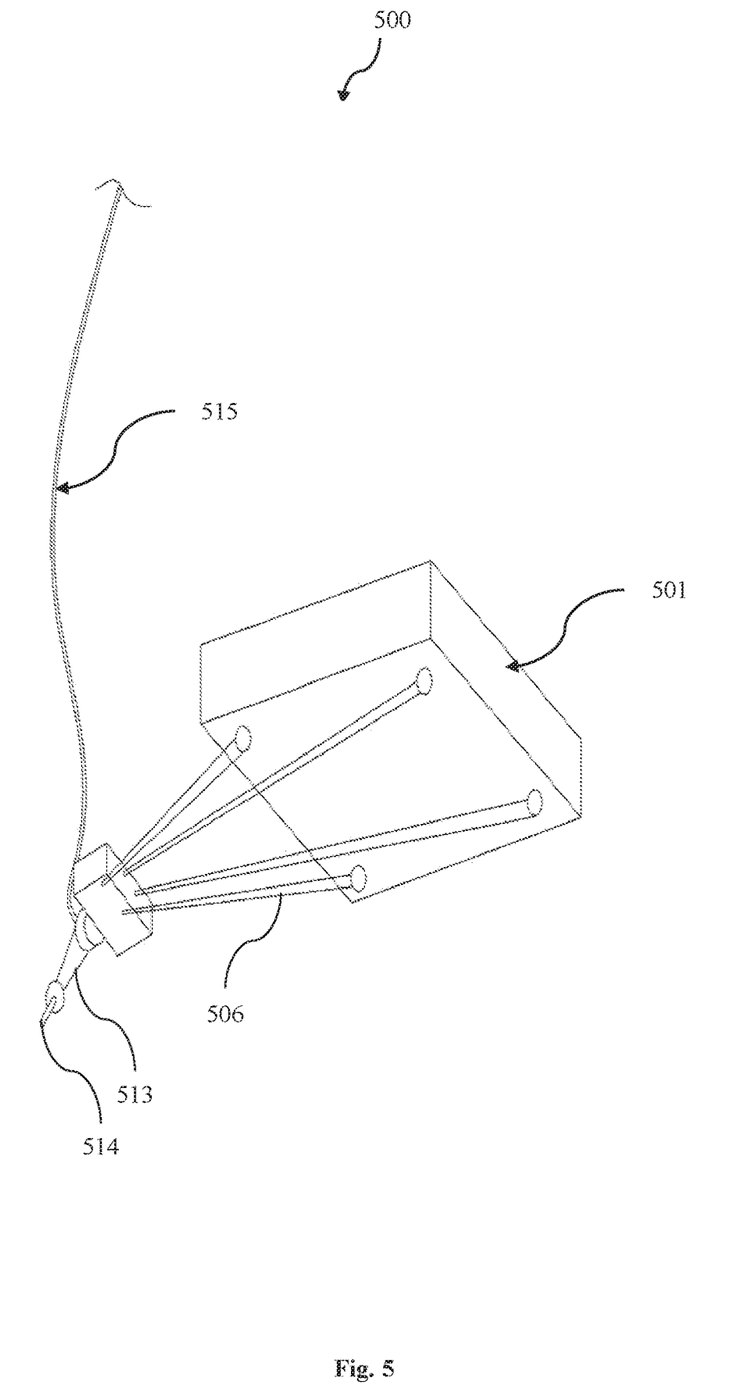
FIG. 5 illustrates a structure of a printing device arrangement according to an exemplary embodiment.

In FIG. 5, a structure of a printing device arrangement 500 is shown. Here, the superconductor 501 or a unit carrying the superconductor 501 (which is seen to be equivalent throughout the description), has attached thereto the connection arrangement 506, for example in the form of thin arms, which connects to the printing head 513 which comprises a nozzle 514. In addition, a supply tube 515 is connected to the printing head 513 and the nozzle 514, respectively, which supplies the printing material to the same.

In all of the above arrangements, the object is printed on a plate which is arranged on the ground, i.e. a printing bed on the ground, which is preferably non-moving.

Figure 6:
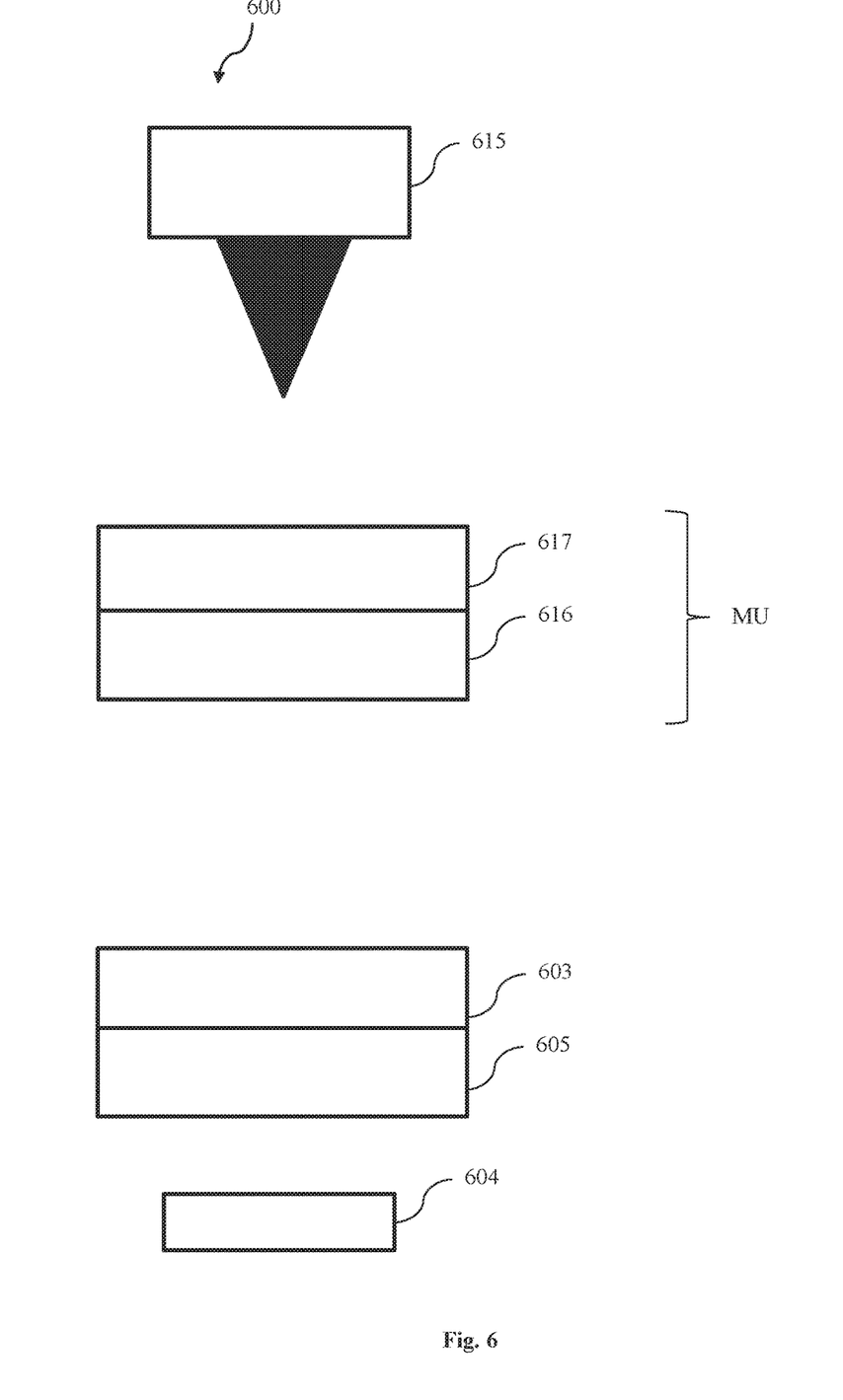
FIG. 6 illustrates an alternative embodiment having a hovering printing bed.

In an alternative embodiment which is shown in FIG. 6, instead of a hovering printing head, a hovering printing bed 617 may be provided on which the object is printed. Thus, the printing head 615 is fixed for example to a top structure of the 3D printing device 600 while a movable unit MU comprising a superconductor 616 and a print bed 617 is hovering in space using the magnetic field generator 603 which may be moved using the moving device 605 and the control device 604 in a similar manner as described above with respect to the other embodiments. It is to be noted that also all other embodiments may be amended similarly by replacing the printing head connected to the movable unit MU by the printing bed 617 and by attaching the printing head 615 to a fixed structure of the 3D printing device 600. For details it is therefore to the description of all other embodiments. The same, of course, also applies to the use of a coupling device and to the arrangement of multiple magnetic field generators.

In the claims, the word "comprising" does not exclude other elements or steps and the indefinite article "a" or "and" does not exclude a plurality. The mere fact that certain measures are recited in mutually different dependent claims does not indicate that a combination of these measures cannot be used to advantage. Reference numerals in the claims only serve clarification purposes and do not limit the scope of the claims.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A three-dimensional (3D) printing device, comprising:
   printing material;
   a printing bed;
   a superconductor;
   a printing head arrangement configured to print the printing material onto the printing bed, wherein either the printing head arrangement or the printing bed is attached for movement with the superconductor;
   a magnetic field generator configured to generate a magnetic field
   a movement device configured to move the magnetic field generator in at least one direction, perpendicular to a force-locking direction between the superconductor and the magnetic field generator, the movement device comprising at least one linear motor; and
   a control device;
   wherein the magnetic field generator and the superconductor are configured to couple in a force-locking manner by frozen magnetic flux between the magnetic field generator and the superconductor; and
   wherein the control device is configured to control a magnetic field strength of the magnetic field generator.

2. The 3D printing device according to claim 1, wherein the magnetic field generator is a first magnetic field generator, and wherein the superconductor is a second superconductor, the 3D printing device further comprising a coupling device comprising:
   a second magnetic field generator adapted to generate a second magnetic field; and
   a first superconductor;
   wherein the first magnetic field generator and the first superconductor are configured to couple in a force-locking manner by frozen magnetic flux between the first magnetic field generator and the first superconductor; and
   wherein the second magnetic field generator and the second superconductor are configured to couple in a force-locking manner by frozen magnetic flux between the second magnetic field generator and the second superconductor.

3. The 3D printing device according to claim 2, wherein the control device is further configured to control a second magnetic field strength of the second magnetic field generator to move the second superconductor.

4. The 3D printing device according to claim 1, further comprising a supply tube connected to the print head arrangement and configured to supply the printing material to the print head arrangement.

5. The 3D printing device according to claim 1, wherein the printing head arrangement is attached to the superconductor by a connection arrangement configured to carry the printing head arrangement.

6. The 3D printing device according to claim 1, wherein the magnetic field generator is a first magnetic generator, the 3D printing device further comprising a second magnetic field generator, wherein:
the superconductor is located directly between the first magnetic field generator and the second magnetic field generator; and
the second magnetic field generator and the superconductor are configured to couple in a force-locking manner by a second frozen magnetic flux between the second magnetic field generator and the superconductor.

7. The 3D printing device according to claim 6, wherein a second force-locking direction from the second magnetic field generator to the superconductor is collinear with and opposite to a first force-locking direction from the first magnetic field generator to the superconductor.

8. The 3D printing device according to claim 7 further comprising:
a second movement device configured to move the second magnetic field generator in at least one direction perpendicular to the second force-locking direction, wherein the second movement device comprises at least one linear motor.

9. The 3D printing device according to claim 6, wherein a first line passes through the first magnetic field generator, the superconductor and the second magnetic field generator, the 3D printing device further comprising a third magnetic field generator to generate a third magnetic field, wherein:
the third magnetic field generator is coupled with a third frozen magnetic flux to the superconductor along a third direction perpendicular to the first line.

10. The 3D printing device according to claim 9, wherein:
a third force-locking direction from the third magnetic field generator to the
superconductor is perpendicular to a first force-locking direction from the first magnetic field generator to the superconductor; and
the third magnetic field generator is configured to move the superconductor in a direction perpendicular to the first force-locking direction.

11. A three-dimensional (3D) printing device, comprising:
printing material;
a printing bed;
a printing head arrangement configured to print the printing material onto the printing
a first magnetic field generator configured to generate a first magnetic field;
a first superconductor, wherein the first magnetic field generator is coupled with a first frozen magnetic flux to the first superconductor;
a movement device configured to move the first magnetic field generator in at least one direction, perpendicular to a force-locking direction between the first superconductor and the first magnetic field generator, the movement device comprising at least one linear motor;
a second magnetic field generator configured to generate a second magnetic field, wherein the second magnetic field generator is mounted for movement with the first superconductor; and
a second superconductor, wherein the second magnetic field generator is coupled with a second frozen magnetic flux to the second superconductor, and wherein either the printing head arrangement or the printing bed is attached for movement with the second superconductor.

12. The 3D printing device according to claim 11, wherein the first superconductor is located directly between the first magnetic field generator and the second superconductor.

13. The 3D printing device according to claim 11, wherein the printing head arrangement is attached to the second superconductor.

14. A three-dimensional (3D) printing device, comprising:
printing material;
a printing bed;
a superconductor;
a printing head arrangement configured to print the printing material onto the printing bed, wherein either the printing head arrangement or the printing bed is attached for movement with the superconductor;
a first magnetic field generator configured to generate a magnetic field, wherein the first magnetic field generator and the superconductor are configured to couple in a force-locking manner in a first force-locking direction by frozen magnetic flux between the first magnetic field generator and the superconductor;
a second magnetic field generator configured to generate a magnetic field, wherein the superconductor is located directly between the first magnetic field generator and the second magnetic field generator, and wherein the second magnetic field generator and the superconductor are configured to couple in a force-locking manner in a second force-locking direction by a second frozen magnetic flux between the second magnetic field generator and the superconductor, the second force-locking direction collinear with and opposite to the first force-locking direction;
a control device, wherein the control device is configured to control a magnetic field strength of the magnetic field generator;
a first movement device configured to move the first magnetic field generator in at least one direction, perpendicular to the first force-locking direction, the movement device comprising at least one linear motor; and,
a second movement device configured to move the second magnetic field generator in at least one direction perpendicular to the second force-locking direction, wherein the second movement device comprises at least one linear motor.

* * * * *